United States Patent
Kuno (10) Patent No.: US 8,547,594 B2
(45) Date of Patent: Oct. 1, 2013

(54) PROFILE CORRECTING DEVICE

(75) Inventor: Masashi Kuno, Obu (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 1009 days.

(21) Appl. No.: 12/568,143

(22) Filed: Sep. 28, 2009

(65) Prior Publication Data
US 2010/0079779 A1 Apr. 1, 2010

(30) Foreign Application Priority Data
Sep. 29, 2008 (JP) ................................ 2008-250755

(51) Int. Cl.
*G06F 15/00* (2006.01)
*G06K 1/00* (2006.01)

(52) U.S. Cl.
USPC .............................. 358/1.9; 358/518; 358/520

(58) Field of Classification Search
USPC ......................................................... 358/1.9
See application file for complete search history.

(56) References Cited

U.S. PATENT DOCUMENTS

| 6,762,858 B2 * | 7/2004 | Haro ............................. 358/1.9 |
| 2004/0190022 A1 * | 9/2004 | Kiyohara ........................ 358/1.9 |
| 2005/0052668 A1 * | 3/2005 | Hoshino ........................ 358/1.9 |
| 2008/0123164 A1 | 5/2008 | Suzuki |

FOREIGN PATENT DOCUMENTS

| JP | 2000-253269 | 9/2000 |
| JP | 2005-079620 | 3/2005 |
| JP | 2005-080045 | 3/2005 |
| JP | 2007-189278 | 7/2007 |
| JP | 2007-288489 | 11/2007 |
| JP | 2008-141237 | 6/2008 |
| JP | 2008-227869 | 9/2008 |

OTHER PUBLICATIONS

Japanese Official Action dated Oct. 12, 2010 with English language translation.

* cited by examiner

*Primary Examiner* — Benny Q Tieu
*Assistant Examiner* — Michael Y Tzeng
(74) *Attorney, Agent, or Firm* — Scully, Scott, Murphy & Presser, P.C.

(57) ABSTRACT

The present invention provides a profile calibrating device, method and program capable of performing color matching with no significant loss in precision relative to absolute color matching while preventing strange sensation in the rendered black and white colors. The profile correcting device includes a first profile acquiring unit, a second profile acquiring unit, a first connecting unit, and a second correcting unit. The first profile acquiring unit acquires a first profile representing correspondence relationship between input color values and first colorimetric values. The second profile acquiring unit acquires a second profile representing correspondence relationship between the input color values and second colon metric values. The first correcting unit corrects the second colorimetric value for the white value, and the second colon metric value for the black value. The second correcting unit corrects the second colonimetric value for the near-white color value, and the second calorimetric value for the near-black color value.

11 Claims, 7 Drawing Sheets

PROFILE CORRECTING DEVICE

CROSS REFERENCE TO RELATED APPLICATION

This application claims priority from Japanese Patent Application No. 2008-250755 filed Sep. 29, 2008. The entire content of the priority application is incorporated herein by reference

TECHNICAL FIELD

The present invention relates to a profile correcting device.

BACKGROUND

The colors in images produced on two different image forming devices often differ, even when the image forming devices form images based on the same image data. In other words, if two printers A and B print images based on the same image data, the colors in printed material a produced by the printer A may differ from the colors in printed material b produced by the printer B. These differences in color may be caused by a variety of differences between the two printers, such as the type of printing system (inkjet system, laser system, or the like), type of colorant (pigment ink, dye-based ink, toner, or the like, as well as the manufacturer of the colorant), and type of paper used in the printer, and the type of image processing performed on the image data.

A technique using ICC profiles is well known in the art as a method of color matching designed to produce the same colors in printed materials obtained from different printers. This technique will be described for a case in which the colors of printed material b produced by the printer B are being matched to colors in printed material a produced by the printer A. Here, "printer A" will be referred to as the "target printer" since colors produced by the printer B are being calibrated to match colors in the printed material a, and "printer B" will be referred to as the "output-end printer" since the colors calibrated to match colors in printed material a are outputted by the printer B.

First, a plurality of color images (color patches) for creating a profile is printed on both printers A and B, and a colorimeter is used to measure the colors in each resulting printed material. Next, an ICC profile is created based on the image data and the colorimetric values.

Next, image data used for printing images on the printer B is converted to CIELAB values according to the ICC profile for the printer A. The CIELAB values are then converted to RGB data based on the ICC profile for the printer B so that the printer B can generate printed material b having the same colors as those in the printed material a produced by the printer A.

Relative color matching is performed using the ICC profiles described above, with the color of the paper in regions that colorant is not deposited serving as white, and the color of the black colorant deposited on the paper serving as black. Specifically, a normalization process is performed so that white (the color of the paper) takes on Lab values (100, 0, 0), and black (the black color that can be rendered with the printer) takes on Lab values (0, 0, 0). Hence, white is rendered simply by the color of the paper (i.e., without depositing ink of any color), while black is rendered with the black ink color used by the printer. However, since this normalization process shifts the axis linking black with white, there is an overall shift in all colors other than black and white, resulting in decreased precision in color matching.

It is also possible to perform absolute color matching that does not include the normalization process. This technique achieves high-precision color matching since the shift in colors caused by the normalization process does not occur. However, in absolute color matching, colored ink is visibly deposited on the white paper background when rendering white, as well as when rendering black.

Figure 7:
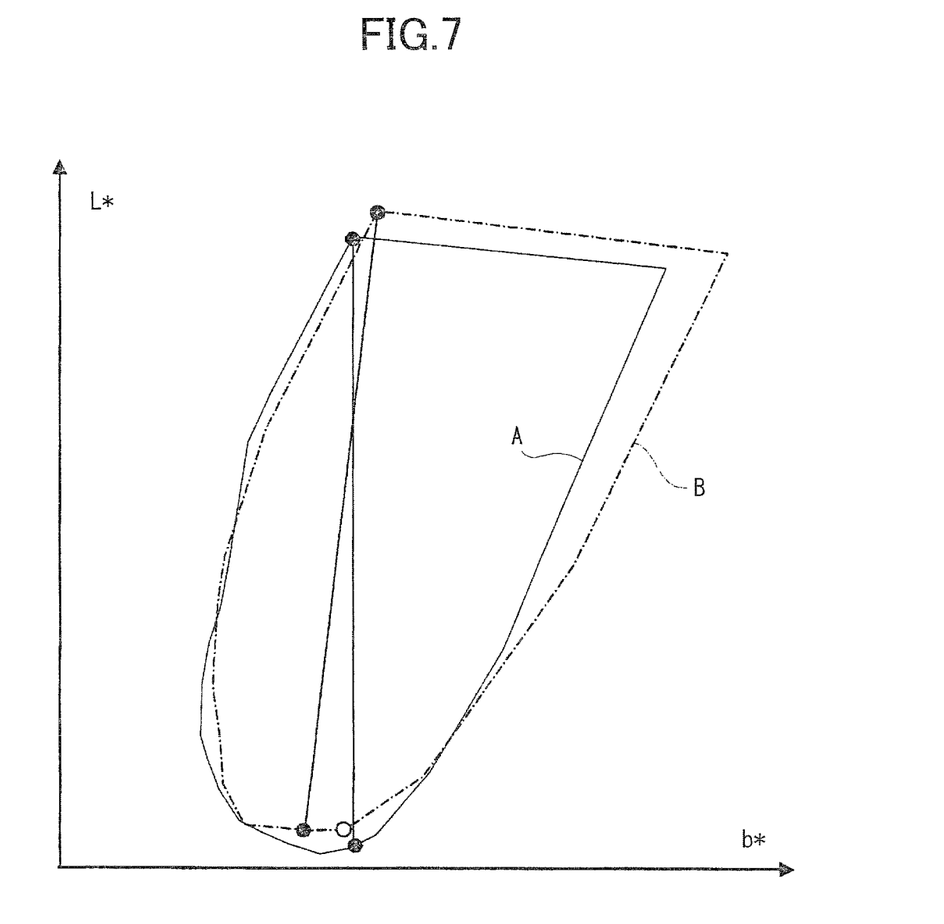
FIG. 7 is a graph showing color gamut that can be produced on two printers and that are plotted according to L* and b* axes of CIELAB color space.

FIG. 7 is a graph showing an example of ranges of colors that can be produced on both printers A and B (color gamut) that are plotted according to the L* and b* axes of the CIELAB color space. The black dots in the upper portion of the graph represent white (RGB=255, 255, 255), and the black dots in the lower portion of the graph represent black (RGB=0, 0, 0).

Thus, when rendering white, the output-end printer B cart produce white that is lighter than the white produced by the target printer A based on the characteristics shown in FIG. 7. Accordingly, the printer B deposits a slight amount of colored ink when producing a white equivalent to that of the printer A. On the other hand, since the printer B cannot render the black color that the printer A can produce, the printer B must use a different color for black. This replacement color is generally a color approaching the target color and in the example of FIG. 7 is depicted by a white dot (unfilled circle). While the printer B renders both black and white properly according to the principles of absolute color matching, this method results in colored ink being visibly deposited on the paper for both white and black.

From the perspective of accurate matching, the rendering of white and black colors in this way will be unpleasant to the viewer. On the other hand, relative color matching causes an overall shift in all colors, resulting in a considerable drop in the precision of color matching compared to absolute color matching.

SUMMARY

In view of the foregoing, it is an object of the invention to provide a profile calibrating device, method, and program capable of performing color matching with no significant loss in precision relative to absolute color matching, while preventing a strange sensation in the rendered white and black colors.

In order to attain the above and other objects, the invention provides a profile correcting device including a first profile acquiring unit, a second profile acquiring unit, a first correcting unit, and a second correcting unit. The first profile acquiring unit acquires a first profile representing correspondence relationship between input color values and first colorimetric values. Each first colorimetric value corresponds to one input color value and represents a color that is reproduced by a first image forming device based on the one input color value. The input color values includes a white value indicative of white, a black value indicative of black, a near-white color value indicative of a color near to white, and a near-black color value indicative of a color near to black. The second profile acquiring unit acquires a second profile representing correspondence relationship between the input color values and second colorimetric values. Each second colorimetric value corresponds to one input color value and represents a color that is reproduced by a second image forming device based on the one input color value. The second image forming device is different from the first image forming device. The first correcting unit corrects the second colorimetric value for the white value to a value equal to the first colorimetric value for the white value, and corrects the second colorimetric value for the black value to a value equal to the first colorimetric value for the black value. The second correcting unit corrects the second colorimetric value for the near-white color value to a weighted average of the first and second colorimetric values for the near-white color value, and corrects the second colorimetric value for the near-black color value to a weighted average of the first and second colorimetric values for the near-black color value.

According to another aspect, the present invention provides a profile correcting method comprising: acquiring a first profile representing correspondence relationship between input color values and first colorimetric values, each first calorimetric value corresponding to one input color value and representing a color that is reproduced by a first image forming device based on the one input color value, the input color values including a white value indicative of white, a black value indicative of black, a near-white color value indicative of a color near to white, and a near-black color value indicative of a color near to black; acquiring a second profile representing correspondence relationship between the input color values and second colorimetric values, each second calorimetric value corresponding to one input color value and representing a color that is reproduced by a second image forming device based on the one input color value, the second image forming device being different from the first image forming device; correcting the second calorimetric value for the white value to a value equal to the first colorimetric value for the white value; correcting the second colorimetric value for the black value to a value equal to the first colorimetric value for the black value; correcting the second calorimetric value for the near-white color value to a weighted average of the first and second colorimetric values for the near-white color value; and correcting the second colorimetric value for the near-black color value to a weighted average of the first and second colorimetric values for the near-black color value.

According to another aspect, the present invention provides a computer-readable recording medium that stores a data processing program, the data processing program comprising instructions for: acquiring a first profile representing correspondence relationship between input color values and first colorimetric values, each first colorimetric value corresponding to one input color value and representing a color that is reproduced by a first image forming device based on the one input color value, the input color values including a white value indicative of white, a black value indicative of black, a near-white color value indicative of a color near to white, and a near-black color value indicative of a color near to black; acquiring a second profile representing correspondence relationship between the input color values and second calorimetric values, each second calorimetric value corresponding to one input color value and representing a color that is reproduced by a second image forming device based on the one input color value, the second image forming device being different from the first image forming device; correcting the second colorimetric value for the white value to a value equal to the first colorimetric value for the white value; correcting the second colorimetric value for the black value to a value equal to the first colorimetric value for the black value; correcting the second colorimetric value for the near-white color value to a weighted average of the first and second colorimetric values for the near-white color value; and correcting the second colorimetric value for the near-black color value to a weighted average of the first and second colorimetric values for the near-black color value.

According to another aspect, the present invention provides a profile correcting system including the first profile acquiring unit, the second profile acquiring unit, a profile correcting unit, a first input color value acquiring unit, and a second input color value acquiring unit. The profile correcting unit includes the first correcting unit and the second correcting unit. The first input color value acquiring unit acquires a first input color value used for reproducing a first color by the first image forming device. The second input color value creating unit creates a second input color value based on the first input color value, the first profile, and the corrected second profile when the first input color value acquiring unit acquires the first input color value. The second input color value is used for reproducing a second color the same as the first color by the second image forming device.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
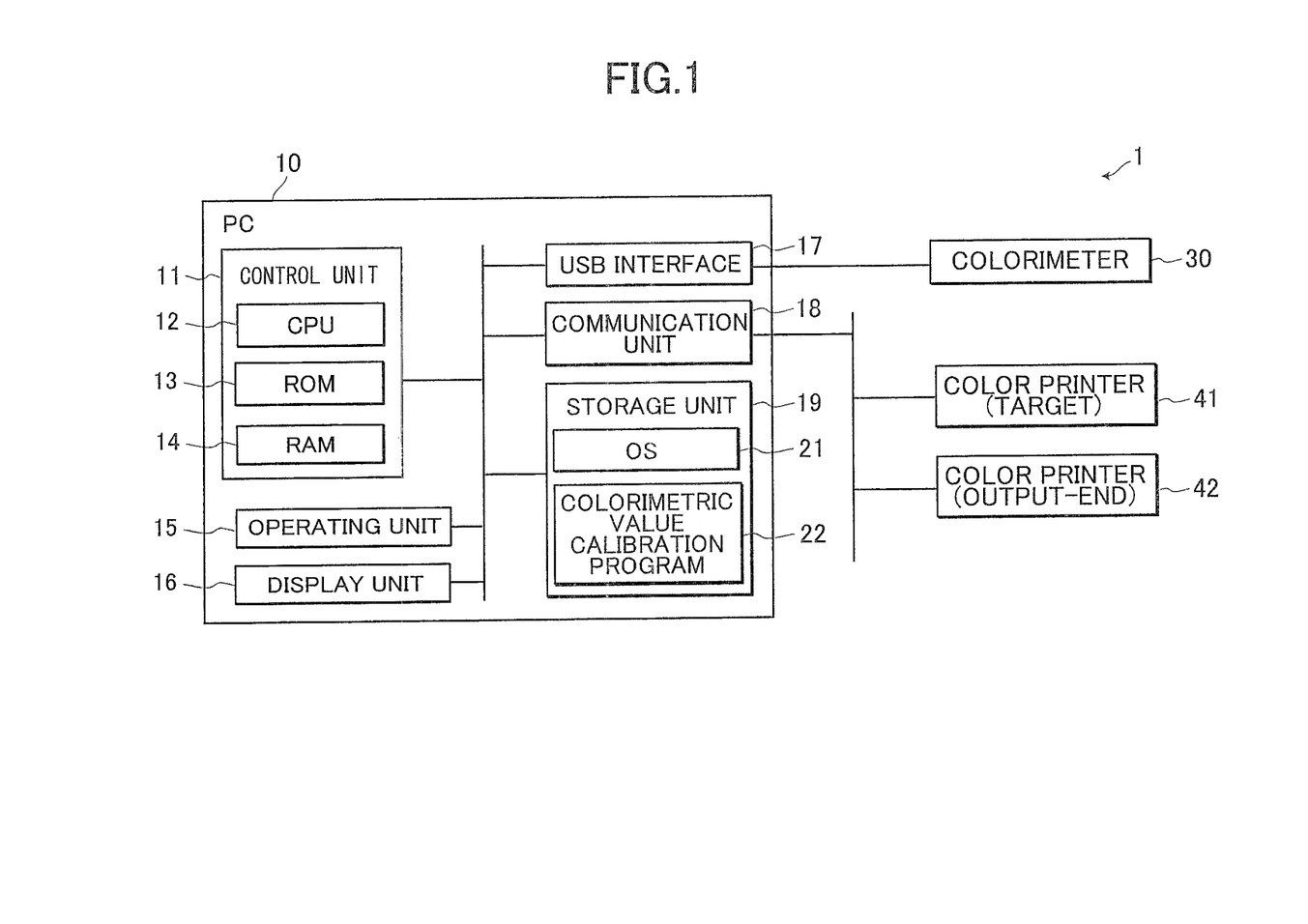
FIG. 1 is a block diagram showing a profile correcting system including first and second image forming devices and a profile correcting device according to an embodiment of the present invention.

A color conversion system 1 according to an embodiment of the invention will be described with reference to FIGS. 1-6. As shown in FIG. 1, the color conversion system 1 includes a personal computer (thereafter, referred as "PC") 10, a colorimeter 30, and color printers 41 and 42. The PC 10 includes a control unit 11, operating unit 15, display unit 16, USB interface 17, communication unit 18, and storage unit 19. The control unit 11 is primarily configured of a microcomputer having a CPU 12, a ROM 13, and a RAM 14, and performs overall control of the components constituting the PC 10.

The operation unit 15 enables a user to externally input instructions, such as a keyboard, a pointing device (mouse), and the like. The display unit 16 functions to display visible images representing various information, such as a liquid crystal display.

The USB interface 17 transmits and receives data over a USB cable. The PC 10 can communicate with the colorimeter 30 via the USB cable. The colorimeter 30 has functions for expressing the measured colors of color patches as color values within a device-independent uniform color space (the CIELAB color space in this embodiment) and for transmitting these color values to the PC 10. The communication unit 18 enables to transmit and receive data via network. The PC 10 is capable of communicating with the color printers 41 and 42 via LAN (Local Area Network). When the color printers 41 and 42 receive color image data represented by CMYK values from the PC 10, the color printers 41 and 42 form an image on a recording sheet based on the color image data.

The storage unit 19 is a hard disk that stores various data, operating system (OS) 21 and installed a colorimetric value calibration program 22. The color value calibration program 22 is used for performing a colorimetric value calibration process by the control unit 11.

The PC 10 executes a color matching process for suitably matching colors of a printed material produced on the color printer 42 (hereinafter referred to as the "output-end printer 42") to the colors in a printer material produced on the color printer 41 (hereinafter referred to as the "target printer 41").

More specifically, the PC 10 performs color matching according to the following procedure. First, the PC 10 controls both the target printer 41 and output-end printer 42 to print color patches for creating profiles on both the target printer 41 and output-end printer 42. For example, the PC 10 may control the both printers to print color patches based on RGB values for color patches (input color values) while varying each of the RGB values over nine steps (in the case of 8-bit color values, each of the RGB values will be alternately set to 0, 32, 64, 96, 128, 160, 192, 224, and 255) so as to produce colors in all possible permutations, i.e., 9×9×9=729 color patches. The RGB values for color patches include a white value indicative of white, a black value indicative of black, a near-white color value indicative of a color near to white, a near-black color value indicative of a color near to black, a yellow value indicative of yellow, and a blue value indicative of blue. The near-white color is defined to be in a near-white region set to the portion of the gamut near to white, and the near-black color is defined to be in a near-black region set to the portion of the gamut near to black.

Next, the colorimeter 30 measures the color of each color patch printed by both the target printer 41 and output-end printer 42 in order to obtain colorimetric values (CIELAB values in the embodiment) for each of the 729 colors.

Next, the PC 10 creates each of an ICC profile of the target printer 41 (hereinafter referred to as the "target profile") and an ICC profile of the output-end printer 42 (hereinafter referred to as the "output-end profile") based on the relationship between the RGB values used for printing the color patches and the colorimetric values measured by the colorimeter 30. Here, the PC 10 corrects the output-end profile. Specifically, the PC 10 corrects the output-end profile so that the output-end colorimetric values used in creating the output-end profile, i.e., the colorimetric values obtained for color patches printed on the output-end printer 42, approach the target colorimetric values used in creating the target profile, i.e., the colorimetric values obtained for color patches printed on the target printer 41.

More specifically, the PC 10 corrects the output-end colorimetric values for the white value and the black value in the output-end profile to values equivalent to the target colorimetric values for the white value and the black value in the target profile, and corrects colorimetric values for the near-white color value and the near-black color value to a weighted average of the target colorimetric values and output-end colorimetric values. The remaining colorimetric values of the output-end profile are left unchanged.

When controlling the output-end printer 42 to print an image based on image data (RGB values in the embodiment), the PC 10 can perform color matching by converting the image data to CIELAB values based on the target profile, retrieving RGB values corresponding to the CIELAB values in the corrected output-end profile, and subsequently converting the CIELAB values back to the RGB values as new image data. As a result of these conversions, the output-end printer 42 can output printed material in the same colors as those in the printed material produced by the target printer 41. When the PC 10 transmits the new image data to the output-end printer 42, the output-end printer 42 can reproduce a color image the same as that formed by the target printer 41 based on the new image data.

Figure 2:
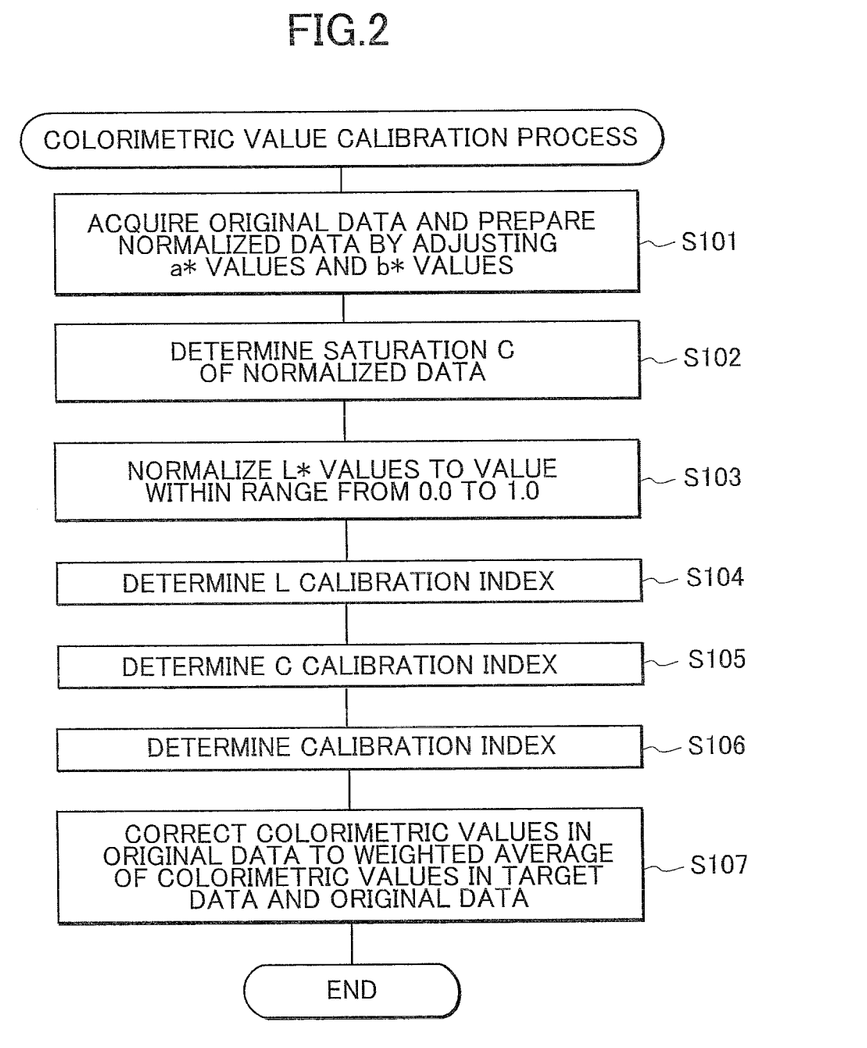
FIG. 2 is a flowchart illustrating steps in a calorimetric value calibration process executed by the profile correcting device.

FIG. 2 is a flowchart illustrating steps in a colorimetric value calibration process executed by the CPU 12 of the control unit 11 based on the colorimetric value calibration program 22. In S101 at the beginning of the colorimetric value calibration process, the CPU 12 acquires the output-end colorimetric values (i.e., the non-adjusted CIELAB values; hereinafter referred to as "original data"), in other words, the CPU 12 acquires the output-end profile and the target profile as described above. Then the CPU 12 prepares normalized data by adjusting (normalizing) a* and b* values in the original data in S101. Specifically, the original data is normalized, so that both a* and b* values in the colorimetric values for white (RGB=255, 255, 255) and black (RGB=0, 0, 0) are 0.

In S102 the CPU 12 calculates a saturation C for each set of colorimetric values in the normalized data created in S101. In the CIELAB color space, the saturation C is expressed by the Euclidean distance C=sqrt($a^2+b^2$).

In S103 the CPU 12 performs a normalization process on the normalized data created in S101 so that the L* value for the colors white and black become the maximum L* value (1.0 in this case) and the minimum L* value (0.0), respectively. Hence, L* values for white and black are normalized to the range 0.0-1.0.

The subsequent process of S104-S107 is executed repeatedly for each set of colorimetric values in sequence. In other words, the process is executed for the RGB values of each color patch (each set of colorimetric values for the 729 colors). In S104 the CPU 12 determines an L calibration index for each set of RGB values, i.e., an index for calibrating lightness L* value, based on each L* value of the output-end colorimetric value for each set of RGB values within the normalized data created in S103.

Figure 3:
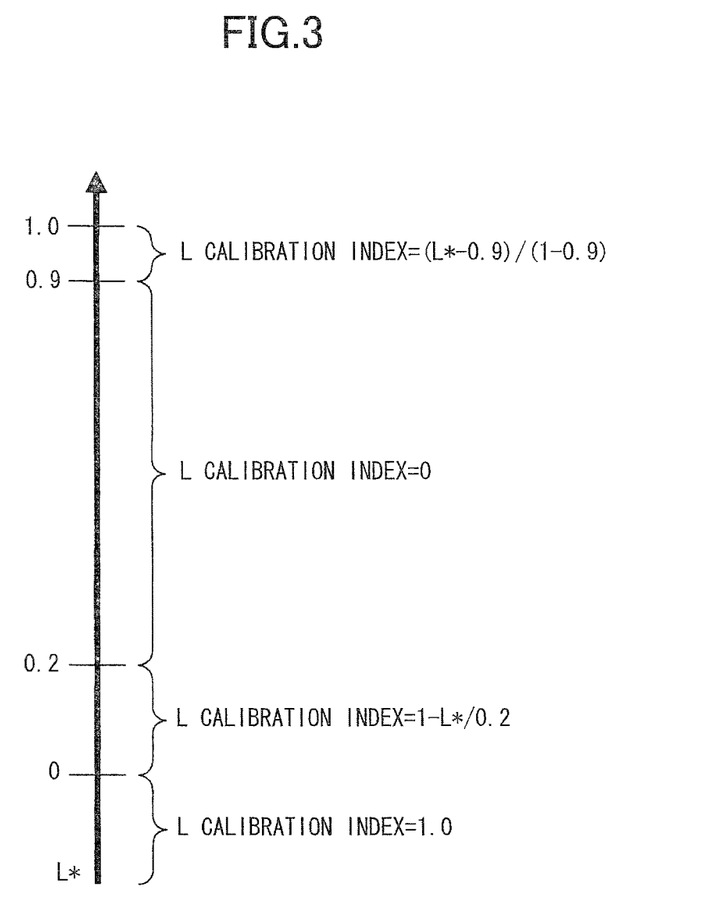
FIG. 3 is an explanatory diagram illustrating how to determine lightness calibration index.

FIG. 3 illustrates how to determine the L calibration index, where boundary values 0.2 and 0.9 between which the L calibration index is 0, are referred to as the calibration coefficients of L* value. These calibration coefficients are preset. The method of setting the L calibration indices is described below.

L*<0:L calibration index=1.0

0≤L*<0.2:L calibration index=1−$L$*/0.2

0.2≤L*<0.9:L calibration index=0

0.9≤L*≤1.0:L calibration index=($L$*−0.9)/(1−0.9)

Hence, the L calibration index is set to a value within the range from 0 to 1. L* value is normalized based on values of white (RGB=255, 255, 255) and black (RGB=0, 0, 0) as described above in S103. Accordingly, L* values less than 0 are considered since, while there exists no points at which L* is higher than the value of the white paper, there may exist points at which L* value is lower than the value of black (for example, blue can have a lower lightness than black).

In S105 the CPU 12 determines, for each set of RGB values, C calibration index for calibrating saturation C, based on the saturation C found in S102.

Figure 4:
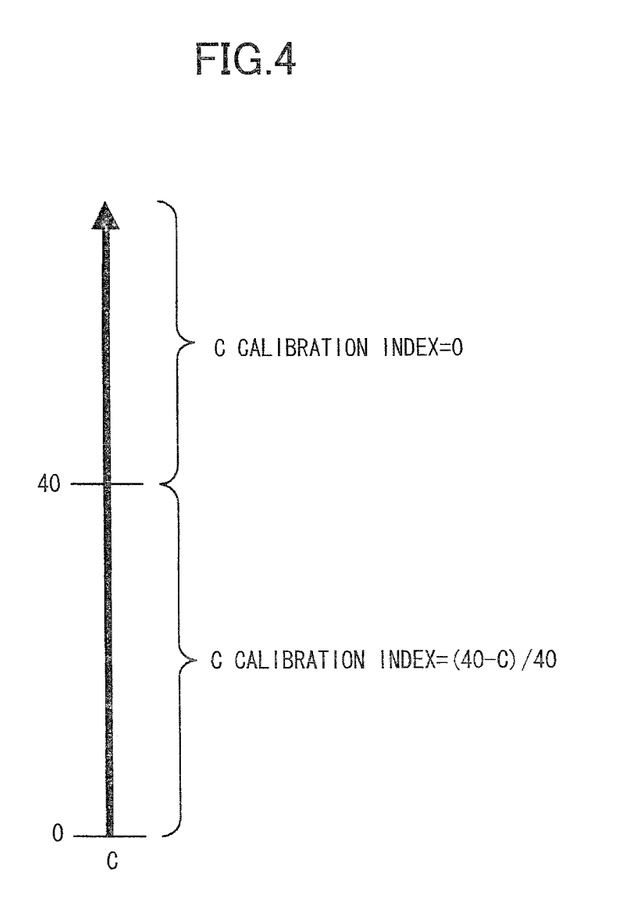
FIG. 4 is an explanatory diagram illustrating how to determine saturation calibration index.

FIG. 4 illustrates how to determine the C calibration index, where a boundary value of 40 at which the C calibration index becomes 0 is referred to as the C calibration coefficient. This calibration coefficient is preset. The method of setting the C calibration indices is described below.

$$0 \leq C < 40 : C \text{ calibration index} = (40 - C)/40$$

$$40 \leq C : C \text{ calibration index} = 0$$

Hence, the C calibration indices are set to values within the range from 0 to 1.

In S106 the CPU 12 determines, for each set of RGB values, calibration index for use in correcting the original data by multiplying the L calibration index determined in S104 by the C calibration index determined in S105. The calibration indices are consequently values within the range of 0-1.

$$\text{Calibration index} = L \text{calibration index} \times C \text{calibration index}$$

In S107 the CPU 12 corrects, for each set of RGB values, the output-end calorimetric values (original data) to weighted averages of the target calorimetric values for the RGB values (target data) and the output-end calorimetric values for the RGB values (original data) based on the calibration index for the RGB values found in S106. Specifically, the CPU 12 performs calibration on each of the L*, a*, and b* values.

$$\text{Calibrated original data} = \text{original data} \times (1 - \text{calibration index}) + \text{target data} \times \text{calibration index}$$

That is, the calibrated original data is equal to the original data when the calibration index is 0, and is equal to the target calorimetric data (i.e., calibration is performed with the largest calibration amount) when the calibration index is 1. For values between 0 and 1, the larger the calibration index, the larger the amount of calibration performed on the original data. As is clear from the method of calculating the calibration index in S106, the calibration index is 0 when at least one of the L calibration index and C calibration index is 0. Accordingly, only the near-white colors and near-black colors in the near-white and near-black regions defined by the L calibration coefficients (0.9 and 0.2) and the C calibration coefficient (40) described above are targeted for calibration. In other words, the CPU 12 corrects the output-end calorimetric value for the near-white color value to a weighted average whose value becomes closer to the target colormetric value for the near-white color as the L* value for the near-white color value increases and the saturation C for the near-white color value decreases. Further, the CPU 12 corrects the output-end colorimetric value for the near-black color value to a weighted average whose value becomes closer to the target calorimetric value for the near-black color value as the L* value for the near-black color value decreases and the saturation C for the near-black color value decreases.

Figure 5:
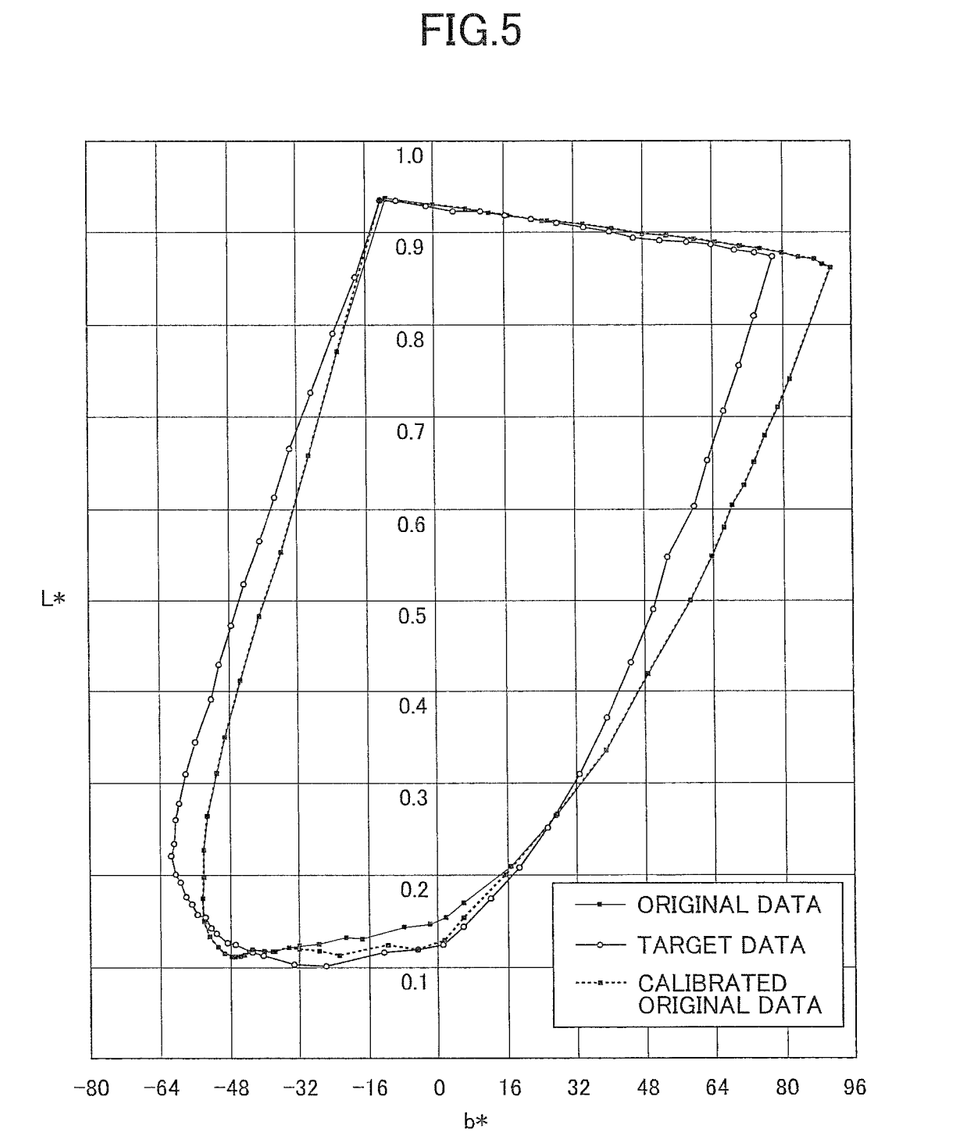
FIG. 5 is a graph showing first calorimetric value, second colorimetric values, and a result of correcting second colorimetric values that are plotted according to L* and b* axes of CIELAB color space.

FIG. 5 shows the results of correcting all output-end colorimetric values in this way. As shown in FIG. 5, the output-end colorimetric values are calibrated to approach the target colorimetric values in the near-white region and the near-black region, but are not calibrated in the intermediate region between these regions. The CPU 12 creates the corrected output-end profile based on the calibrated output-end calorimetric values. Then, when controlling the output-end printer 42 to print an image based on image data (RGB values), the CPU 12 converts the image data to CIELAB values based on the target profile, retrieving RGB values corresponding to the CIELAB values in the corrected output-end profile, and subsequently converting the CIELAB values back to new RGB values as new image data. And then, the CPU 12 transmits the new image data to the output-end printer 42. When the output-end printer receives the new image data, the output-end printer 42 can reproduce a color image the same as that formed by the target printer 41 based on the new image data.

Next, the method of setting the L calibration coefficients (0.2 and 0.9 in the above example) and the C calibration coefficient (40 in the above example) will be described.

The CPU 12 sets the L calibration coefficient specifying the boundary of the near-white region (0.9 in the above example) to a value within a range higher than the lower lightness of the target and output-end colorimetric values for the primary color yellow (RGB=255, 255, 0) in the original data. In other words, the L calibration coefficient is set to a value within a range in which the target of calibration is the RGB data whose corresponding lightness higher than that of yellow, which is the lightest of the primary colors (a range that does not include the primary colors).

Similarly, the CPU 12 sets the L calibration coefficient representing the boundary of the near-black region (0.2 in the above example) to a value within a range lower than the higher lightness of the target and output-end colorimetric values for the primary color blue (RGB=0, 0, 255) in the original data. In other words, the L calibration coefficient is set to a value within a range in which the target of calibration is lower than that of the lightness for blue, which is the darkest of the primary colors (a range that does not include the primary colors).

Figure 6:
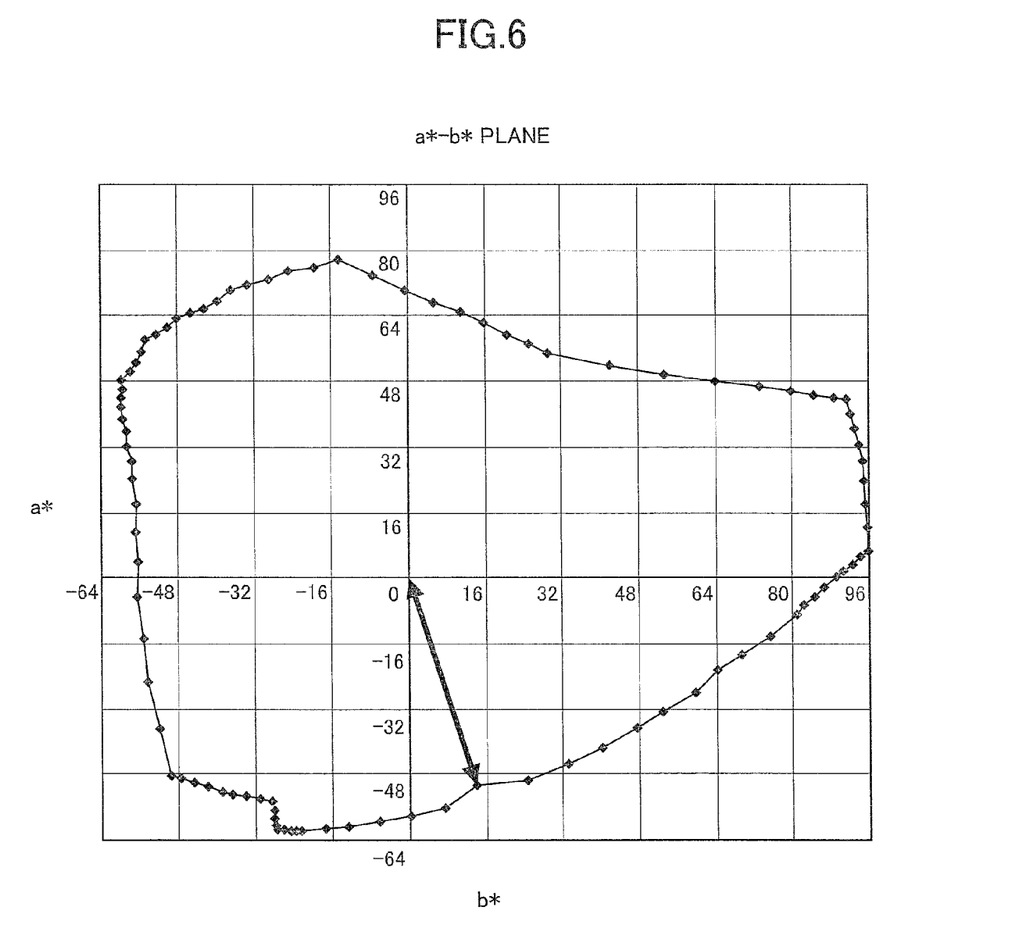
FIG. 6 is a graph showing a gamut produced by projecting all the second colorimetric values onto an a*–b* plane of CIELAB color space.

The C calibration coefficient (40 in the above example) is set to a value smaller than the smallest saturation that is determined based on at least a part of the output-end calorimetric values that normalized data created in S101 and are located on an outline boundary of gamut produced by projecting all the normalized data onto the a*-b* plane (a projected gamut viewed along the L axis), as shown in FIG. 6. The arrow in the example of FIG. 6 indicates the smallest saturation value, which is about 50. Hence, the C calibration coefficient is set to a smaller value so that the output-end colorimetric value with the smallest saturation is not calibrated.

As described above, the PC 10 corrects the output-end colorimetric values for white and black to values equal to the unmodified target calorimetric values for white value and black value, and corrects output-end colorimetric values for the near-white color values in the regions near white and black to a weighted average of the target calorimetric values and the output-end colorimetric values based on the lightness and saturation. Hence, this method can prevent an unpleasant expression of the colors white and black in printed material. Moreover, such the remaining output-end colorimetric values in regions of the color gamut not including the near-white region and the near-black region are preserved unchanged, the effects of absolute color matching can be obtained for this region of the gamut. Hence, this method of the present invention achieves precise color matching for intermediate colors while preventing colored ink from being deposited on the paper for white or black.

Here, output-end colorimetric values for the near-white color values and near-black color values that fall within the near-white region and the near-black region are set to weighted averages of the target colorimetric values and output-end colorimetric values based on corresponding calibration index obtained by multiplying corresponding L calibration index based on the lightness of the output-end colorimetric values targeted for calibration and corresponding C calibration index based on the saturation of the output-end colorimetric values. Therefore, a ratio of target colorimetric values and output-end colorimetric values for determining weighted averages can be set through a simple yet suitable method. A particular feature of this method is its ability to limit the color range targeted for calibration to a range satisfying both conditions of lightness and saturation and to prevent the calibration of colorimetric values with intermediate lightness and colorimetric values with high saturation.

The PC 10 also corrects output-end colorimetric values for the near-white color values to values closer to the target colorimetric values for the near-white color values as lightness for the near-white color values increases and saturation for the near-white color values decreases, and corrects output-end colorimetric values for the near-black color values to values closer to the target colorimetric values for the near-black color values as lightness for the near-black color values decreases and saturation for the near-black color values decreases. Therefore, the method of the embodiment can reduce the likelihood of unnatural color reproduction caused by combining color regions in which output-end colorimetric values have been calibrated and regions in which output-end colorimetric values have not been calibrated.

Further, the near-white region is set to the portion of the color gamut having a lightness greater than or equal to the L calibration coefficient (0.9) and a saturation less than or equal to the C calibration coefficient (40), while the near-black region is clearly set to the portion of the color gamut having a lightness less than or equal to the L calibration coefficient (0.2) and a saturation less than or equal to the C calibration coefficient (40). Hence, with the method of the present invention, the PC 10 can easily identify colorimetric values that fall in the near-white region and the near-black region.

On the other hand, the L calibration coefficient (0.9) is set to a value higher than a lower lightness of the target and output-end colorimetric values for the yellow values in the output-end data. Further, the L calibration coefficient (0.2) is set to a value lower than a higher lightness of the target and output-end colorimetric values for the blue values in the output-end data. Additionally, the C calibration coefficient is set to a value lower than the smallest saturation that falls on an outline boundary of the gamut projected along the lightness axis. As a result, output-end colorimetric values for primary colors are not calibrated. Hence, while strictly speaking the potential for yellow being calibrated is not 0%, the effect of such calibration is small enough to be ignored. It is possible to eliminate the chance of yellow being calibrated by setting the L calibration coefficient to a value greater than the colorimetric value with the lightest value expressing yellow. However, if the lightest yellow among the target colorimetric values and the original data is considerably high than the other, this method of setting the L calibration coefficient will make the near-white region too small. Therefore, in the preferred embodiment, the L calibration coefficient is set higher than the colorimetric value with the lowest lightness among colorimetric values representing yellow While the invention has been described in detail with reference to the embodiment thereof, it would be apparent to those skilled, in the art that various changes and modifications may be made therein without departing from the spirit of the invention.

In the embodiment described above, the calibration coefficients (0.2 and 0.9) are preset as first and second lightness, and the C calibration coefficient (40) is preset as first and second saturations. However, these values may be automatically set (or suitably modified) based on the profiles (colorimetric values) used for color matching.

Further, the output-end printer 42 may perform at least one step in the colorimetric value calibration process instead of the PC 10. Further, the output-end printer 42 may acquire image data represented by RGB values and create new image data based on the acquired image data, the target profile, and the corrected output-end profile.

Further, while a color printer is used as an example of an image forming device in the embodiment, any device capable of forming color images may be used.

What is claimed is:

1. A profile correcting device comprising:
a processor; and
memory storing computer readable instructions that, when executed by the processor, cause the profile correcting device to implement:
generating a first profile including first values representing correspondence relationship between input color values and first colorimetric values,
   wherein each first colorimetric value is obtained by measuring a color reproduced based on corresponding one input color value by a first image forming device,
   wherein the input color values include a white value indicative of white, a black value indicative of black, a near-white color value indicative of a color near to white, and a near-black color value indicative of a color near to black, and
   wherein the first colorimetric values include a white value indicative of white, a black value indicative of black, a near-white color value indicative of a color near to white, and a near-black color value indicative of a color near to black;
generating a second profile including second values representing correspondence relationship between the input color values and second colorimetric values,
   wherein each second colorimetric value is obtained by measuring a color reproduced based on corresponding one input color value by a second image forming device,
   wherein the second colorimetric values include a white value indicative of white, a black value indicative of black, a near-white color value indicative of a color near to white, and a near-black color value indicative of a color near to black, and
   wherein the second image forming device is different from the first image forming device; and
generating a corrected second profile including corrected second values representing correspondence relationship between the input color values and corrected second colorimetric values, wherein the corrected second colorimetric values are obtained by:
replacing the second colorimetric value for the white value with a value equal to the first colorimetric value for the white value;
replacing the second colorimetric value for the black value with a value equal to the first colorimetric value for the black value,
replacing the second colorimetric value for the near-white color value with a particular input color value,
   wherein a lightness of the particular input color value is greater than or equal to a first setting lightness, and
   wherein a saturation of the particular input color value is less than or equal to a first setting saturation; and
replacing the second colorimetric value for the near-black color value with another input color value,
   wherein a lightness of another input color value is less than or equal to a second setting lightness, and
   wherein a saturation of the another input color value is less than or equal to a second setting saturation,
wherein the lightness of the particular input color value and the lightness of the another input color value are determined based on the second colorimetric value for each input color value;

wherein the saturation of the particular input color value and the saturation of the another input color value are determined based on the second colorimetric value for each input color value.

2. The profile correcting device according to claim 1, the computer readable instructions further comprising:
determining a second lightness for each input color value based on the second colorimetric value for each input color value,
determining a saturation for each input color value different from the particular input color value and the another input color value, based on the second colorimetric value for the each input color value, and
wherein the second colorimetric value for the near-white color value is replaced with a weighted average whose value becomes closer to the first colorimetric value for the near-white color value as the second lightness for the near-white color value increases and the saturation of the particular input color value decreases, and the second colorimetric value for the near-black color value is replaced with a weighted average whose value becomes closer to the first colorimetric value for the near-black color value as the second lightness for the near-black color value decreases and the saturation of the another input color value decreases.

3. The profile correcting device according to claim 2, the computer readable instructions further comprising:
determining a lightness calibration index for the near-white color value based on the second lightness for the near-white color value and determining a lightness calibration index for the near-black color value based on the second lightness for the near-black color value;
determining a saturation calibration index for the near-white color value based on the saturation for the near-white color value and determining a saturation calibration index for the near-black color value based on the saturation for the near-black color value;
determining a calibration index for the near-white color value by multiplying the lightness calibration index for the near-white color value by the saturation calibration index for the near-white color value and determining a calibration index for the near-black color value by multiplying the lightness calibration index for the near-black color value by the saturation calibration index for the near-black color value; and
determining a weighted average of the first and second colorimetric values for the near-white color value based on the calibration index for the near-white color value and determining a weighted average of the first and second colorimetric values for the near-black color value based on the calibration index for the near-black color value,
wherein the second colorimetric value for the near-white color value is replaced with the weighted average for the near-white color value and the second colorimetric value for the near-black color value is replaced with the weighted average for the near-black color value.

4. The profile correcting device according to claim 3, the computer readable instructions further comprising:
determining, for the near-white color value, the lightness calibration index whose value increases as the second lightness for the near-white color value becomes closer to the second lightness for the white value, and determining, for the near-black color value, the lightness calibration index whose value increases as the second lightness for the near-black color value becomes closer to the second lightness for the black value;
determining, for the near-white color, the saturation calibration index whose value increases as the saturation for the near-white color value decreases, and determining, for the near-black color value, the saturation calibration index whose value increases as the saturation for the near-black color value decreases;
determining the weighted average whose value becomes closer to the first colorimetric value for the near-white color value as the calibration index for the near-white color value increases and becomes closer to the second colorimetric value for the near-white color value as the calibration index for the near-white color value decreases; and
determining the weighted average whose value becomes closer to the first colorimetric value for the near-black color value as the calibration index for the near-black color value increases and becomes closer to the second colorimetric value for the near-black color value as the calibration index for the near-black color value decreases.

5. The profile correcting device according to claim 1, wherein the input color values further include yellow value indicative of yellow and a blue value indicative of blue;
the computer readable instructions further comprising determining a first lightness for each input color value based on the first colorimetric value for each the input color value;
wherein the first setting lightness is higher than the lower lightness of the first and second lightness for the yellow value; and
wherein the second setting lightness is lower than the higher lightness of the first and second lightness for the blue value.

6. The profile correcting device according to claim 1, wherein each input color value is represented by RGB values; and
wherein each of the first colorimetric value and the second colorimetric value is represented by L*a*b* values.

7. The profile correcting device according to claim 6, wherein each of the first setting saturation and the second setting saturation is smaller than the smallest saturation that is determined based on at least a part of the second colorimetric values that are located on an outline boundary of gamut, the gamut being produced by projecting all the second colorimetric values onto an a*-b* plane.

8. The profile correcting device according to claim 1, the computer readable instructions further comprising:
generating a first input color value used for reproducing a first color by the first image forming device;
generating a second input color value based on the first input color value, the first profile, and the corrected second profile when the the first input color value is generated, the second input color value used for reproducing a second color the same as the first color by the second image forming device; and
transmitting the second input color value to the second image forming device.

9. A profile correcting method comprising:
generating a first profile including first values representing correspondence relationship between input color values and first colorimetric values,
wherein each first colorimetric value is obtained by measuring a color reproduced based on corresponding one input color value by a first image forming device,
wherein the input color values include a white value indicative of white, a black value indicative of black, a near-white color value indicative of a color near to white, and a near-black color value indicative of a color near to black, and wherein the first colorimetric values include a white value indicative of white, a black value indicative of black, a near-white color value indicative of a color near to white, and a near-black color value indicative of a color near to black;

generating a second profile including second values representing correspondence relationship between the input color values and second colorimetric values, wherein each second colorimetric value is obtained by measuring a color reproduced based on corresponding one input color value by a second image forming device, wherein the second colorimetric values include a white value indicative of white, a black value indicative of black, a near-white color value indicative of a color near to white, and a near-black color value indicative of a color near to black, and wherein the second image forming device is different from the first image forming device; and generating a corrected second profile including corrected second values representing correspondence relationship between the input color values and corrected second colorimetric values, wherein the corrected second colorimetric values are obtained by:

replacing the second colorimetric value for the white value with a value equal to the first colorimetric value for the white value;

replacing the second colorimetric value for the black value with a value equal to the first colorimetric value for the black value;

replacing the second colorimetric value for the near-white color value with a particular input color value, wherein a lightness of the particular input color value is greater than or equal to a first setting lightness, and wherein a saturation of the particular input color value is less than or equal to a first setting saturation; and replacing the second colorimetric value for the near-black color value with another input color value, wherein a lightness of another input color value is less than or equal to a second setting lightness, and wherein a saturation of the another input color value is less than or equal to a second setting saturation, wherein the lightness of the particular input color value and the lightness of the another input color value are determined based on the second colorimetric value for each input color value;

wherein the saturation of the particular input color value and the saturation of the another input color value are determined based on the second colorimetric value for each input color value.

10. A non-transitory computer-readable recording medium that stores a data processing program, the data processing program comprising instructions for:

generating a first profile including first values representing correspondence relationship between input color values and first colorimetric values, wherein each first colorimetric value is obtained by measuring a color reproduced based on corresponding one input color value by a first image forming device, wherein the input color values include a white value indicative of white, a black value indicative of black, a near-white color value indicative of a color near to white, and a near-black color value indicative of a color near to black, and wherein the first colorimetric values include a white value indicative of white, a black value indicative of black, a near-white color value indicative of a color near to white, and a near-black color value indicative of a color near to black;

generating a second profile including second values representing correspondence relationship between the input color values and second colorimetric values, wherein each second colorimetric value is obtained by measuring a color reproduced based on corresponding one input color value by a second image forming device, wherein the second colorimetric values include a white value indicative of white, a black value indicative of black, a near-white color value indicative of a color near to white, and a near-black color value indicative of a color near to black, and wherein the second image forming device is different from the first image forming device; and generating a corrected second profile including corrected second values representing correspondence relationship between the input color values and corrected second colorimetric values, wherein the corrected second colorimetric values are obtained by:

replacing the second colorimetric value for the white value with a value equal to the first colorimetric value for the white value;

replacing the second colorimetric value for the black value with a value equal to the first colorimetric value for the black value;

replacing the second colorimetric value for the near-white color value with a particular input color value, wherein a lightness of the particular input color value is greater than or equal to a first setting lightness, and wherein a saturation of the particular input color value is less than or equal to a first setting saturation; and replacing the second colorimetric value for the near-black color value with another input color value, wherein a lightness of another input color value is less than or equal to a second setting lightness, and wherein a saturation of the another input color value is less than or equal to a second setting saturation, wherein the lightness of the particular input value and the lightness of the another input color value are determined based on the second colorimetric value for each input color value;

wherein the saturation of the particular input color value and the saturation of the another input color value are determined based on the second colorimetric value of each input color value.

11. A profile correcting system comprising a plurality of devices, each of the plurality of devices including a processor and a memory storing computer readable instructions, the computer readable instructions stored in the memories of the plurality of devices, when executed by the respective processors, causing the plurality of devices to perform profile correcting operations such that one of the plurality of devices performs a part of the profile correcting operations and the others of the plurality of devices perform the remaining part of the profile correcting operations, the profile correcting operations including:

generating a first profile including first values representing correspondence relationship between input color values and first colorimetric values, wherein each first colorimetric value is obtained by measuring a color reproduced based on corresponding one input color value by a first image forming device, wherein the input color values include a white value indicative of white, a black value indicative of black, a near-white color value indicative of a color near to white, and a near-black color value indicative of a color near to black;

wherein the first colorimetric values include a white value indicative of white, a black value indicative of black, a near-white color value indicative of a color near to white, and a near-black color value indicative of a color near to black;

generating a second profile including second values representing correspondence relationship between the input color values and second colorimetric values, wherein each second colorimetric value is obtained by measuring a color reproduced based on corresponding one input color value by a second image forming device, wherein the second colorimetric values include a white value indicative of white, a black value indicative of black, a near-white color value indicative of a color near to white, and a near-black color value indicative of a color near to black, and wherein the second image forming device is different from the first image forming device, and generating a corrected second profile including corrected second values representing correspondence relationship between the input color values and corrected second colorimetric values, wherein the corrected second colorimetric values are obtained by:

replacing the second colorimetric value for the white value with a value equal to the first colorimetric value for the white value;

replacing the second colorimetric value for the black value with a value equal to the first colorimetric value for the black value;

replacing the second colorimetric value for the near-white color value with a particular input color value,
wherein a lightness of the particular input color value is greater than or equal to a first setting lightness, and
wherein a saturation of the particular input color value is less than or equal to a first setting saturation; and replacing the second colorimetric value for the near-black color value with another input color value,
wherein a lightness of another input color value is less than or equal to a second setting lightness, and
wherein a saturation of the another input color value is less than or equal to a second setting saturation, wherein the lightness of the particular input color value and the lightness of the another input color value are determined based on the second colorimetric value for each input color value;

wherein the saturation of the particular input color value and the saturation of the another input color value are determined based on the second colorimetric value for each input color value.

* * * * *